Patented Oct. 12, 1954

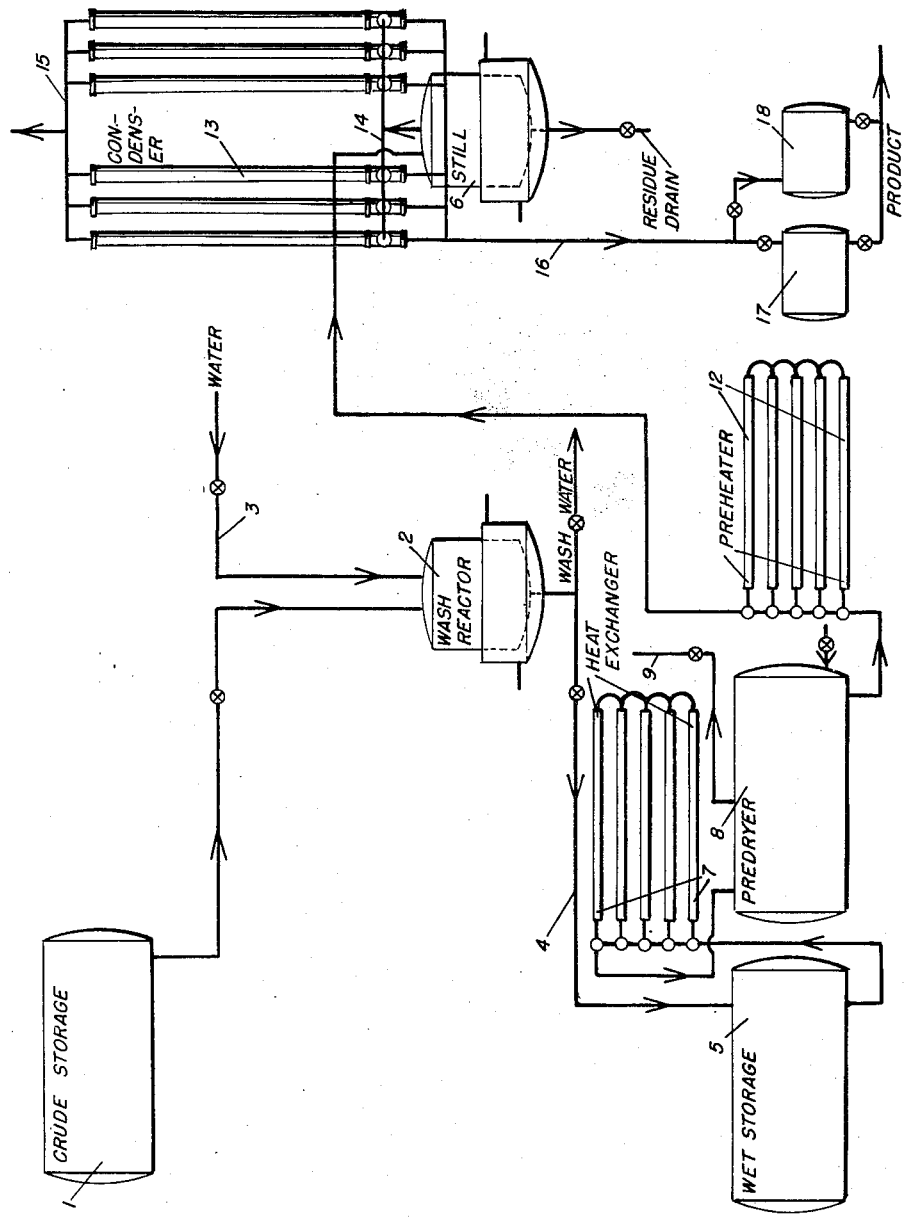

2,691,626

UNITED STATES PATENT OFFICE

2,691,626
PURIFICATION OF MUSTARD GAS

Charles C. Price, Urbana, Ill., Orville H. Bullitt, Jr., Whitemarsh, Pa., Herbert E. Hudson, Jr., Fairfax County, Va., and Arthur M. Buswell, Urbana, Ill., assignors to the United States of America as represented by the Secretary of War Application March 14, 1945, Serial No. 582,820

3 Claims. (Cl. 202—60)

The invention described herein may be manufactured and used by or for the Government for governmental purposes without the payment to us of any royalty thereon.

This invention relates to a process of purifying Levinstein mustard. In accordance with this invention, substantially pure mustard may be prepared from Levinstein mustard by a simple and inexpensive treatment.

The agent known as mustard or mustard gas is the most important chemical warfare vesicant known to date. Chemically pure mustard is regarded as being dichloroethyl sulfide.

Although there have been several processes for manufacturing mustard, the most important in this country is the Levinstein process. The product of the Levinstein process is commonly known to those skilled in the art as Levinstein mustard.

In the Levinstein process, mustard is formed by direct reaction of ethylene gas on sulfur monochloride. While this reaction under proper conditions proceeds smoothly, sulfur is set free, and the temperature must be controlled in order to keep the sulfur in colloidal suspension. There is considerable difficulty in separating the mustard from the colloidal sulfur, and accordingly, the reaction product has been hitherto run to settling or storage tanks then used directly for shell filling without further treatment.

Levinstein mustard is a relatively impure product; its dichloroethyl sulfide content being in the neighborhood of 70%. The impurities of Levinstein mustard are of a complex nature and have not been completely determined.

Although the impure Levinstein mustard has effective vesicant properties, it has the serious objection of being unstable, especially on prolonged storage in steel containers and at elevated temperatures. The exact reason for the degradation of Levinstein mustard has not been fully determined, however, the instability is apparently due to certain impurities, since the pure product is not unstable under the same conditions. From a practical standpoint it is necessary to store large strategic reserves of mustard in steel drums and to maintain large quantities in tropical climates where degradation of the impure mustard is hastened. When the impure mustard undergoes deterioration, pressures develop in the steel drums and then it becomes necessary to destroy the deteriorated material.

A great amount of research has been devoted to the problem of purifying and stabilizing Levinstein mustard since its earliest preparation and use but none of the methods tried gave any particular promise for large scale application.

An object of this invention is to provide an efficient method of treatment for purifying and stabilizing Levinstein mustard.

Another object of this invention is to provide a practical method of treatment for purifying and stabilizing Levinstein mustard for application on a large scale.

In accordance with one embodiment of this invention, Levinstein mustard is first washed with a quantity of water and the washed product is thereafter subjected to distillation to produce the desired product. A relatively large quantity of water may be employed in the initial washing step, which may be carried out a number of times if desired. After the Levinstein mustard has been thoroughly washed, the washwater is separated and the washed product is subjected to distillation, preferably under reduced pressures. Decomposition during distillation is markedly less than for unwashed Levinstein, and the initial fractions of the distillation contain water-white mustard of a high order of purity. The distillation is preferably continued until the distillate begins to show evidence of the presence of color-forming bodies.

The improvement in the distillation after water-washing seems to be due in part to the removal or inactivation by water of some impurity or impurities which lead to decomposition on heating, since distillation of the unwashed material was accompanied by markedly greater decomposition during distillation.

In the following are presented two specific examples of the manner in which this invention has been carried out:

Example 1

A sample of two hundred and seventy-one grams of Levinstein mustard that had been thoroughly washed four times with one hundred volumes of tap water was fractionally distilled at reduced pressure. One hundred and thirty-three grams of material distilled before decomposition of the residue became so great that a vacuum could no longer be obtained. The distilling column was then replaced by a stillhead and 18 g. more was distilled. Thus a total of 151 g. or 56 per cent of the starting material distilled.

| Fraction | Weight in Grams | B. P., degrees | Pressure, mm. | M. P., degrees | Color | Odor |
|---|---|---|---|---|---|---|
| 1 | 59.2 | 72–76 | 1.5–2 | 14.8 | White | Mustard. |
| 2 | 24.2 | 68–73 | 1.5 | 14.3 | do | Do. |
| 3 | 24.2 | 73–78 | 1.5 | 11.6 | Light Yellow | Do. |
| 4 | 4.8 | 78–82 | 2–3 |  | Yellow | Do. |
| 5 | 5.2 | 90–96 | 2–3 |  | do | Foul. |
| 6 | 15.0 | 102 | 3 |  | do | Do. |
| 7 (Stillhead) | 18.4 | 92–135 | 2–5 |  | do | Do. |

The first three fractions represent a 40 per cent recovery of mustard of a high degree of purity, as indicated by its appearance, odor and melting point.

Example 2

A sample of 1100 g. of Levinstein was stirred with water until the weight of unhydrolyzed material was 890 g. The washed material was distilled from a Claisen flask. The first two fractions, amounting to 451 g. and 119 g. respectively, boiled at 59° (1 mm.) and had $n^{20}_D$, 1.5281 and 1.5284 (pure mustard; $n^{20}_D$, 1.5276). These fractions were water-white and had only a very faint odor. The third fraction amounted to 163 g., was yellow in color, foul in odor, and boiled at 59 to 120° (1 to 4 mm.).

On a large plant scale, the method has proved to be even still more efficient. A satisfactory method of application on a large scale will be described with reference to the accompanying flow diagram.

Referring to the flow diagram, crude Levinstein mustard from storage tank 1 is passed to wash vessel 2 wherein it is mixed with water from supply line 3, agitated and settled. The washed mustard is withdrawn from vessel 2 through line 4 to wet storage tank 5.

The washed mustard may be passed directly from line 4 or from the wet storage tank 5 to suitable distillation apparatus such as still 6, which is preferably of corrosion resistant construction, but it is often desirable to predry the washed mustard intermediately before distillation, particularly in large scale operations.

For the predrying the washed mustard may be heated in a suitable apparatus, such as a steam jacketed pipe or coil 7, and sprayed into a tank 8 maintained under vacuum applied through vent 9. The temperature to which the charge of washed mustard is preheated depends on the vacuum, but it should be preferably below the boiling temperature of the mustard at the existing pressure and such that the vapor pressure of water is greater than the existing pressure. Suitable conditions for drying are about 60° C. and 5 mm. of mercury, although these may be varied, e. g., between 25° C. at about 10 mm. of mercury to 200° C. at atmosphere temperature.

During and following admission of the wet mustard to the dryer, air or similar inert drying gas may be run through the mustard to aid in removal of water and water vapor. Air may be used in any amount, but as the amount of air or drying gas is increased, the losses of mustard by vaporization are increased. The drying may be carried out by spraying the mustard into a packed tower with about equal effectiveness.

The mustard may be dried to a still lower water content by addition of a reactive drying agent, e. g., by adding small amounts of thionyl chloride. Thionyl chloride reacts with water to form sulfur dioxide and hydrogen chloride, which are gases readily removed from the mustard by heating and/or subjecting to vacuum. This reaction takes place over a wide temperature range but is preferably carried out between the melting point of crude mustard (5° C. to 9° C.) and the boiling point of thionyl chloride (78° C.).

It is highly desirable to remove the last traces of water from the crude in order that this water will not distill with the first part of the mustard in the distillation step, thereby eliminating the necessity for discarding or re-cycling an initial wet portion of the distillate.

The pre-dried mustard charge for the still 6 may be preheated in a suitable apparatus such as a steam liquid exchanger or preheater 12 in order to eliminate the necessity for cooling the still between batches and to decrease the amount of heat to be added in the still. The amount of preheat added may be varied, but the charge is conveniently heated to approximately the same temperature as the boiling point of the material in the still pot at the existing pressure. Higher or lower temperature may be used but preferably a maximum of about 250° C. is used.

The still 6 is provided with reflux condensers 13, having a vapor inlet connection 14 and a vacuum connection 15. Reflux condensate is withdrawn from the condensers through line 16 to receivers 17 and 18.

Heat is applied to the distillation vessel 6 in any convenient manner and high or low vacuum is applied to the system through line 15. The vacuum is preferably 100 mm. of mercury or lower in order to reduce loss and contamination of the product through thionyl chloride decomposition products. Under 50 mm. mercury absolute pressure, the distillation may be carried out at a still bottom temperature of 135° C., increasing to 175° C. as the distillation progresses, and a still vapor temperature of about 130–140° C. may then be maintained. Distillation is stopped when the flow of condensate slows.

Using a plant process as above outlined, approximately 90% of the dichloroethyl sulfide in the Levinstein mustard charge is recovered as purified mustard of about 95–97% purity.

The distilled mustard may be further improved is stability and purity by passing the distillate through a bed of solid caustic soda (sodium hydroxide) preferably in flake or lump form. The time of contact with the caustic will vary with the size and shape of the solid caustic, but it has been found satisfactory to pass the mustard distillate over commercial flake caustic at a rate of about 1 gallon per gallon of flake caustic at temperatures preferably below 50° C.

The further purification treatment is similarly effective if potassium hydroxide, calcium oxide, barium oxide or the like is used.

The following example demonstrates the purification of Levinstein mustard on a plant scale:

Example 3

For washing, to a 500 gallon glass-lined kettle equiped with an agitator was added 3,000 lbs. of crude Levinstein mustard (approximately 70% dichloroethyl sulfide), 300 cc. of anti-emulsion agent (Tret-o-lite L 17910) and 150 gallons of water. This mixture was agitated vigorously for about five minutes. Agitation was stopped and the material was allowed to separate for twenty minutes. The washed mustard was drawn off to a storage tank and the water layer was discarded. No substantial loss occurred, and the iron content of the mustard was less than 0.01%.

For predrying the wet washed crude (about 300 gallons) was passed through a heat exchanger of stainless steel (or "Hastelloy B") in order to raise the temperature to 60° C. after which this preheated crude was sprayed into a 500 gallon glass-lined tank evacuated to an absolute pressure of 50 mm. of mercury. During the charging period, air was admitted beneath the surface of the liquid through a distributor at a rate of 5 cu. ft. of free air per minute; and the air flow was maintained for twenty minutes after the 300 gallon charge had been admitted. The water content of the charge was reduced to about 0.05% by weight.

For final drying, 60 lbs. of thionyl chloride were added to the vacuum dried charge to obtain thorough mixing. Sulfur dioxide and hydrogen chloride evolved were sent to a suitable absorption apparatus (not shown). The reaction was complete in about five minutes at the existing temperature of 60° C. The dried crude was drawn through a preheater of stainless steel, wherein it was heated to about 120–130° C. and finally discharged into a 500 gallon glass-lined still port fitted with an agitator, stainless steel condensers, receivers and jacketed for heating by means of steam, hot oil or "Dowtherm" liquid at about 200–220° C. The absolute pressure was maintained at about 50 mm. of mercury. The vapor temperature was maintained at about 130–140° C. throughout the distillation. The flow of condensate started immediately and the distillation was continued until the flow of condensate slowed and the evolution of non-condensable decomposition product was observed in the vacuum line. The condensate product was found to be approximately 2,000 lbs. of purified mustard having about 95–98% purity.

It is to be understood that this invention is not to be limited by the detailed proportions and conditions set forth in the foregoing example.

The washing process apparently removes water soluble impurities, including salts, especially those of iron, which cause decomposition of mustard during distillation.

The amount of water used in the washing may be varied from about $\frac{1}{10}$ the volume of crude mustard to more than an equal volume of water; about one-half volume of water is preferred.

The temperature of washing may be varied from about 0° C. to 80° C., although at higher temperature hydrolysis of mustard by the water tends to cause larger loss and the hydrochloric acid formed by the hydrolysis may tend to prevent removal of iron salts from the mustard if the washing is permitted to proceed for exceedingly long periods (e. g., over approximately ten minutes at 80° C.). It is desirable that the hydrochloric content in the water layer should not be more than about 5% for most effective washing, because at higher acid concentrations the removal of iron salts becomes less complete. Accordingly, it is preferred that in the washing the amount of hydrolysis should not exceed about 20% based on the weight of the crude Levinstein mustard subjected to the washing, but in general, from about 5% to 20% of hydrolysis may be expected in the washing.

In a number of instances, it has been found difficult to separate the water and mustard layers satisfactorily due to emulsification. This difficulty is best overcome by addition of emulsion-prevention or demulsifiers, such as "Tret-o-lite" compounds (products of the Tret-o-lite Co., St. Louis, Mo., between about 0.01 and 5% by weight. These agents are of a well known type which demulsify water in organic oil emulsions.

The purified Levinstein mustard obtained in accordance with the treatment of the present invention may have incorporated various stabilizing additives as desired such as anti-oxidants, corrosion inhibitors, and agents which reduce acidity or deleterious effects of impurities. A number of such additives mixed in economical and practical small proportions on the order of 1% give only slight increase in stability to crude Levinstein mustard but not sufficient to warrant their use as stabilizers in the crude mustard. However, they may be used more satisfactorily as additives in the purified mustard. Examples of such stabilizing additives are certain amines, such as alkyl amines.

The principal features of the invention reside in the steps of washing the crude with water and the distillation. Additional steps involved are useful in improving the process, but may be omitted without causing the process to be ineffective. A number of such additional steps are subject matter claimed in a co-pending application Serial No. 598,200, now abandoned, filed by W. L. Rippetoe, Jr. and A. G. Deem on June 7, 1945. Drying with a reactive agent such as thionyl chloride is subject matter of co-pending application Serial No. 596,719 filed May 30, 1945, for Chemical Process, by L. E. Simerl.

This invention is not to be lmited to any of the examples which have been presented for explanation of the described process, since there are various modifications which come within the scope of the invention as defined in the following claims.

We claim:

1. A process of preparing purified mustard from Levinstein mustard which comprises washing Levinstein mustard with water, separating the washed mustard from the wash water, heating said mustard to a temperature below the boiling temperature of said mustard at the existing pressure, and thereafter distilling the washed mustard under reduced pressure to obtain a mustard distillate of a high degree of purity.

2. The method of preparing purified mustard from Levinstein mustard that includes in sequence the following steps: mixing said mustard with wash water; settling said mixture; separating said mustard from said water; drying said mustard; heating said mustard to a maximum temperature of about 250° C.; distilling said mustard under a maximum pressure of about 100 mm. of mercury; and maintaining throughout said distillation a vapor temperature within the range of approximately 130° C., to approximately 140° C.

3. The method of claim 2, that includes the step of adding to said mixture an anti-emulsion agent before settling said mixture.

References Cited in the file of this patent

Industrial and Engineering Chemistry, vol. 11, pages 821 and 822 (1919).